United States Patent
Wong et al.

(10) Patent No.: US 9,791,304 B2
(45) Date of Patent: Oct. 17, 2017

(54) AIR DATA PROBE HEATER UTILIZING LOW MELTING POINT METAL

(71) Applicant: Honeywell International Inc., Morris Plains, NJ (US)

(72) Inventors: Yates Wong, Humboldt, AZ (US); Grant A. Gordon, Peoria, AZ (US); Patrick Flynn, Phoenix, AZ (US); Morris Anderson, Mesa, AZ (US); James B. Cox, Glendale, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 175 days.

(21) Appl. No.: 14/919,014

(22) Filed: Oct. 21, 2015

(65) Prior Publication Data

US 2017/0115139 A1    Apr. 27, 2017

(51) Int. Cl.
*G01F 1/46*    (2006.01)
*G01D 11/24*    (2006.01)
*H05B 3/56*    (2006.01)
*G01P 5/165*    (2006.01)

(52) U.S. Cl.
CPC .............. *G01D 11/245* (2013.01); *G01F 1/46* (2013.01); *G01P 5/165* (2013.01); *H05B 3/56* (2013.01)

(58) Field of Classification Search
CPC ................................ G01F 1/46; G01D 11/245
USPC .......................................... 73/170.12; 244/134
See application file for complete search history.

(56) References Cited

U.S. PATENT DOCUMENTS

| | | | |
|---|---|---|---|
| 3,622,755 | A | 11/1971 | Vedder |
| 6,070,475 | A | 6/2000 | Muehlhauser et al. |
| 6,104,611 | A | 8/2000 | Glover et al. |
| 6,903,287 | B2 | 6/2005 | Wong |
| 7,394,088 | B2 | 7/2008 | Lung |
| 2003/0010109 | A1* | 1/2003 | Cronin ........ B64D 43/02 73/170.12 |

(Continued)

FOREIGN PATENT DOCUMENTS

CN    203968553    11/2014
EP    0932831    2/2004

(Continued)

OTHER PUBLICATIONS

Dames et al., "A Hot-Wire Probe for Thermal Measurements of Nanowires and Nanotubes Inside a Transmission Electron Microscope", "Review of Scientific Instruments 78", Oct. 11, 2007, pp. 104903-104903-13.

(Continued)

*Primary Examiner* — Harshad R Patel
*Assistant Examiner* — Jamel Williams
(74) *Attorney, Agent, or Firm* — Fogg & Powers LLC (57) ABSTRACT

An air data probe includes a probe body. The air data probe also includes a housing surrounding the probe body, wherein a cavity is defined between the probe body and the housing. The air data probe also includes a heater element disposed within the cavity between the probe body and the housing. The air data probe also includes a low melting point metal disposed within the cavity between the probe body and the housing, wherein engaging the heater element causes at least a portion of the low melting point metal to transition from a solid state to a liquid state.

20 Claims, 8 Drawing Sheets

(56) References Cited

U.S. PATENT DOCUMENTS

| | | | | |
|---|---|---|---|---|
| 2004/0261518 | A1* | 12/2004 | Seidel | B64D 43/02 |
| | | | | 73/182 |
| 2007/0107510 | A1* | 5/2007 | Agami | G01K 13/02 |
| | | | | 73/182 |
| 2014/0290354 | A1* | 10/2014 | Marty | G01C 21/00 |
| | | | | 73/178 R |
| 2016/0291051 | A1* | 10/2016 | Golly | G01P 1/026 |
| 2016/0304210 | A1* | 10/2016 | Wentland | B33Y 70/00 |

FOREIGN PATENT DOCUMENTS

| | | |
|---|---|---|
| FR | 2329511 | 5/1977 |
| GB | 630429 | 10/1946 |
| WO | 9816837 | 4/1998 |

OTHER PUBLICATIONS

European Patent Office, "Extended European Search Report from EP Application No. 16194241.2 mailed Mar. 16, 2017", "from Foreign Counterpart of U.S. Appl. No. 14/919,014", Mar. 16, 2017, pp. 1-5, Published in: EP.

* cited by examiner

AIR DATA PROBE HEATER UTILIZING LOW MELTING POINT METAL

BACKGROUND

Due to environmental conditions, pitot, pitot-static, and other air data probes on vehicles are exposed to freezing temperatures while on the ground and during flight. The exposure to freezing air temperatures may cause ice to build up on the air data probes, which degrades performance of the air data probes. To prevent ice from building up, many air data probes include heating elements.

SUMMARY

In one embodiment, an air data probe includes a probe body. The air data probe also includes a housing surrounding the probe body, wherein a cavity is defined between the probe body and the housing. The air data probe also includes a heater element disposed within the cavity between the probe body and the housing. The air data probe also includes a low melting point metal disposed within the cavity between the probe body and the housing, wherein engaging the heater element causes at least a portion of the low melting point metal to transition from a solid state to a liquid state.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Traditional air data probes incorporating heating elements include a heater cable brazed to an inner surface of the air data probe housing. To manufacture the air data probe with the heater cable, the heater cable must first be wrapped around a mandrel and the mandrel is then inserted into the housing. The mandrel is extracted and the heater cable must then be brazed to the housing. This method requires a very precise shape for the heater cable and requires that the heater cable be positioned adjacent to the inner surface of the housing. Even if the heater cable is formed properly, it is difficult to obtain a quality braze for the entire length of the heater cable that is adjacent the inner surface of the housing. As a result, traditional air data probes do not provide sufficient heat distribution to the entire housing and cold spots develop where ice is not melted. Further, if heat is not properly distributed away from the heater cable, hot spots can develop in the heater cable and reduce the lifespan of the heater cable. Due to the complexity and difficulty of forming the heater cable and brazing it to the housing, the manufacture of traditional air data probes incorporating heaters is costly and time intensive.

For the reasons stated above and for other reasons stated below which will become apparent to those skilled in the art upon reading and understanding the specification, there is a need in the art for improved systems and methods for air data probe heating and the manufacture of air data probes.

The embodiments described herein provide systems and methods for heating air data probes. The embodiments described herein include a heating element and a low melting point metal, which is a metal whose melting point is below the operational temperature of the heating element, in a cavity between a housing and a probe body of an air data probe. When the heating element is engaged to de-ice the air data probe or prevent icing during flight, at least a portion of the low melting point metal transitions from a solid state to a liquid state. When in a liquid state, the low melting point metal may demonstrate increased thermal conductivity and can provide better heat distribution to the housing because the low melting point metal contacts a greater surface area of the inner surface of the housing than with traditional methods.

Figure 1:
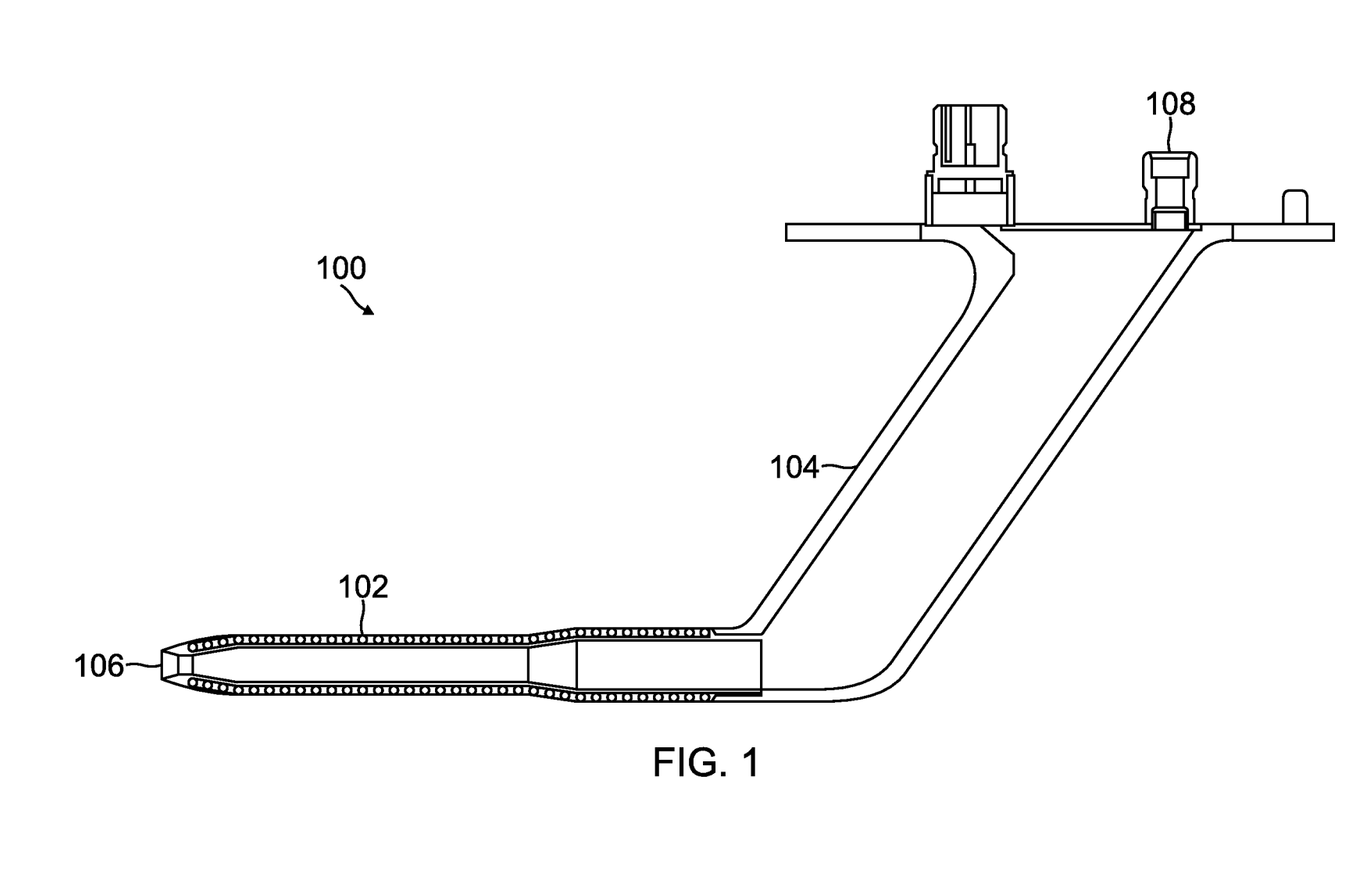
FIG. 1 is a cross-sectional view illustrating an example air data probe according to one embodiment of the present disclosure.

FIG. 1 is a cross-sectional view of an air data probe 100 according to one embodiment of the present disclosure. The air data probe 100 includes a probe portion 102 and a strut portion 104 that connects the probe portion 102 to the vehicle. In exemplary embodiments, the probe portion 102 is a pitot tube, pitot-static tube, or the like. The probe portion 102 is positioned so air enters the probe portion 102 through the inlet 106. In one implementation, the air data probe is used to determine the airspeed of an aircraft.

Figure 2:
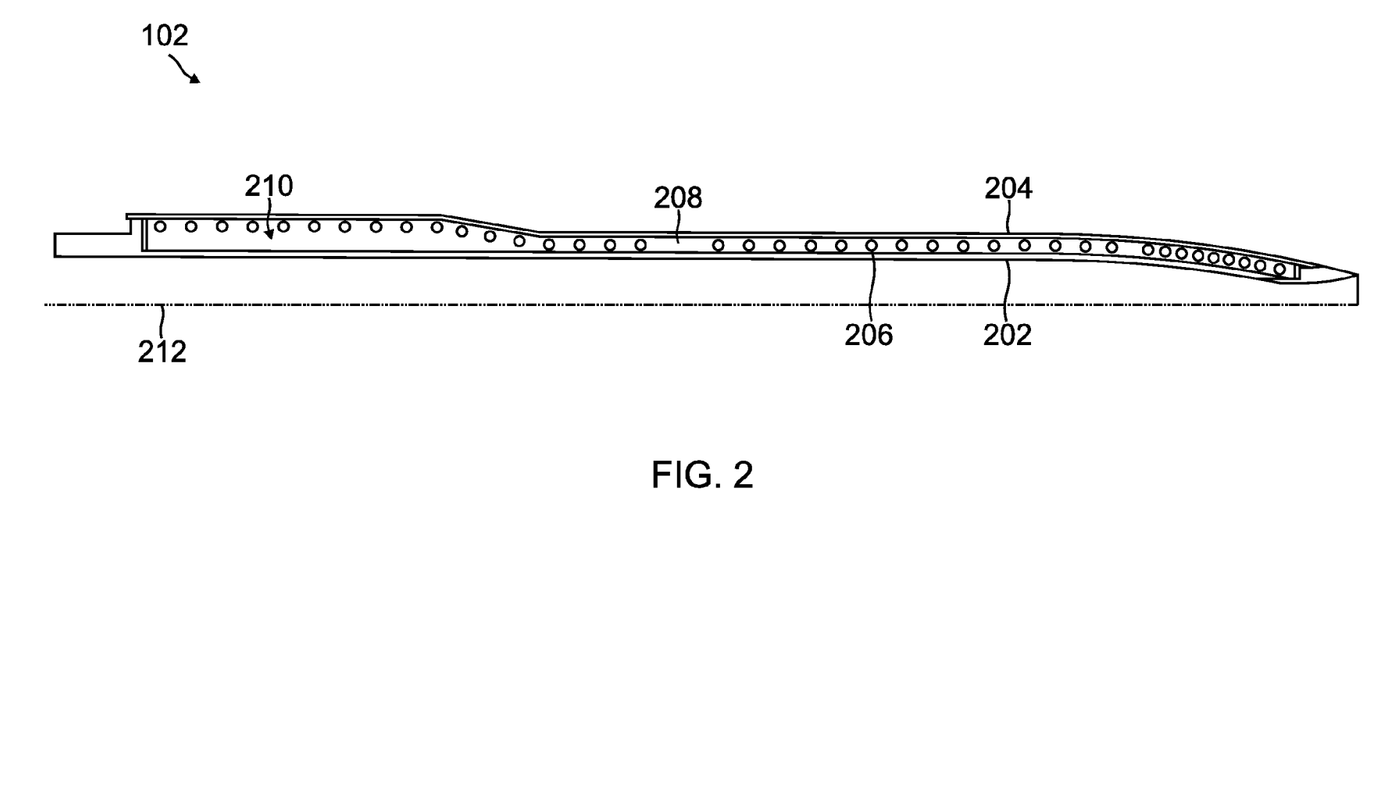
FIG. 2 is a cross-sectional view illustrating a portion of an example air data probe assembly according to one embodiment of the present disclosure.

FIG. 2 illustrates a partial cross-section of one side of the probe portion 102 after the probe portion 102 has been formed. The probe portion 102 comprises a probe body 202 and a housing 204. The probe portion 102 further comprises a heater element 206 and a low melting point metal 208 positioned within a cavity 210 defined between the probe body 202 and the housing 204. In exemplary embodiments, the complete probe portion 102 may be represented by rotating the cross-section about the axis 212.

The housing 204 surrounds the probe body 202 such that the cavity 210 is formed between the probe body 202 and the housing 204. In exemplary embodiments, the probe body 202 is a mandrel. In exemplary embodiments, the probe body 202 and the housing 204 comprise a metal or metal alloy that has high thermal conductivity. The housing 204 and the probe body 202 are attached at the end of the probe portion 102 by the inlet 106. In exemplary embodiments, the housing 204 and the probe body 202 are welded together or attached using a suitable method known to those having skill in the art.

The heater element 206 is positioned within the cavity 210. In exemplary embodiments, the heater element 206 comprises a heater cable. In exemplary implementations, the heater element 206 is a coaxial cable comprised of a resistive wire surrounded by a mineral insulate and covered by a metallic sheath (e.g. Inconel). In exemplary embodiments, the heater element 206 has a generally helical shape such that it winds around the probe body 202. The heater element 206 does not need to have particular dimensions and does not need to be positioned adjacent to an inner surface of the housing 204. Further, the heater element 206 does not need to be brazed to the housing 204 since it rests within the low melting point metal 208. The heater element 206 is engaged either to de-ice the housing 204 prior to takeoff or prevent icing during flight. In exemplary embodiments, electrical power to drive the heater element 206 is delivered through the strut portion 104 and a connector 108. In exemplary embodiments, the operating temperature of the heater element 206 is not uniform throughout all sections of the heater element 206. For example, a section of the heater element 206 near the inlet 106 may have a higher operating temperature than other sections of the heater element 206.

The low melting point metal 208 is disposed within the cavity 210 between the probe body 202 and the housing 204. In exemplary embodiments, the low melting point metal 208 comprises a high thermal conductivity, low melting point metal or metal alloy. For example, the low melting point metal 208 could be sodium; a silver solder; a lead-tin solder; an antimony-tin solder; an indium-silver solder, or other high thermal conductivity, low melting point metals or metal alloys known to those having skill in the art. In exemplary embodiments, the low melting point metal 208 substantially fills the cavity 210. That is, the low melting point metal 208 fills the cavity 210 to essentially eliminate all air gaps within the cavity 210 and make contact with the entire inner surface of the housing 204. In exemplary embodiments, the low melting point metal 208 surrounds the heater element 206.

When the heater element 206 is engaged, at least a portion of the low melting point metal 208 transitions from a solid state to a liquid state. In exemplary embodiments, the melting point of the low melting point metal 208 is between the lowest operational temperature and the maximum operational temperature of the heater element 206 when energized. In exemplary implementations, the melting point of the low melting point metal is between approximately 94 and 204 degrees Celsius (approximately 200 and 400 degrees Fahrenheit). In some embodiments, such as those where the operating temperature of the heater element 206 is not uniform throughout all sections of the heater element 206, only a portion of the low melting point metal 208 transitions from a solid state to a liquid state when the heater element 206 is engaged. In other embodiments, substantially all of the low melting point metal 208 transitions from a solid state to a liquid state when the heater element 206 is engaged. When in a liquid state, the low melting point metal 208 evenly distributes the heat from the heater element 206 to the housing 204. In particular, the low melting point metal 208 conducts the heat from the heater element 206 and distributes the heat to substantially all of the inner surface of the housing 204. When in its liquid state, the low melting point metal 208 can contact portions of the housing 204 that are sharp or oddly-shaped. In particular, the low melting point metal 208 can contact the entire inner surface of the housing 204 at the tip of the housing 204 by the inlet 106, which has been difficult with traditional air data probe heaters. In exemplary embodiments, the thermal conductivity of the low melting point metal is higher in a liquid state than in a solid state.

When a material transitions from a solid state to a liquid state, it will undergo thermal expansion to some degree. Further, a material's coefficient of thermal expansion generally varies with temperature and can be non-linear. Thus, the amount of thermal expansion of the low melting point metal 208 when transitioning from a solid state to a liquid state must be considered. In some embodiments, the amount of low melting point metal 208 disposed within the cavity 210 is adjusted based on the coefficient of thermal expansion of the low melting point metal 208 over the operating temperature of the air data probe. In other embodiments, an expansion chamber may be included in the air data probe design to allow for more flexibility in the amount of low melting point metal that is used.

Figure 3:
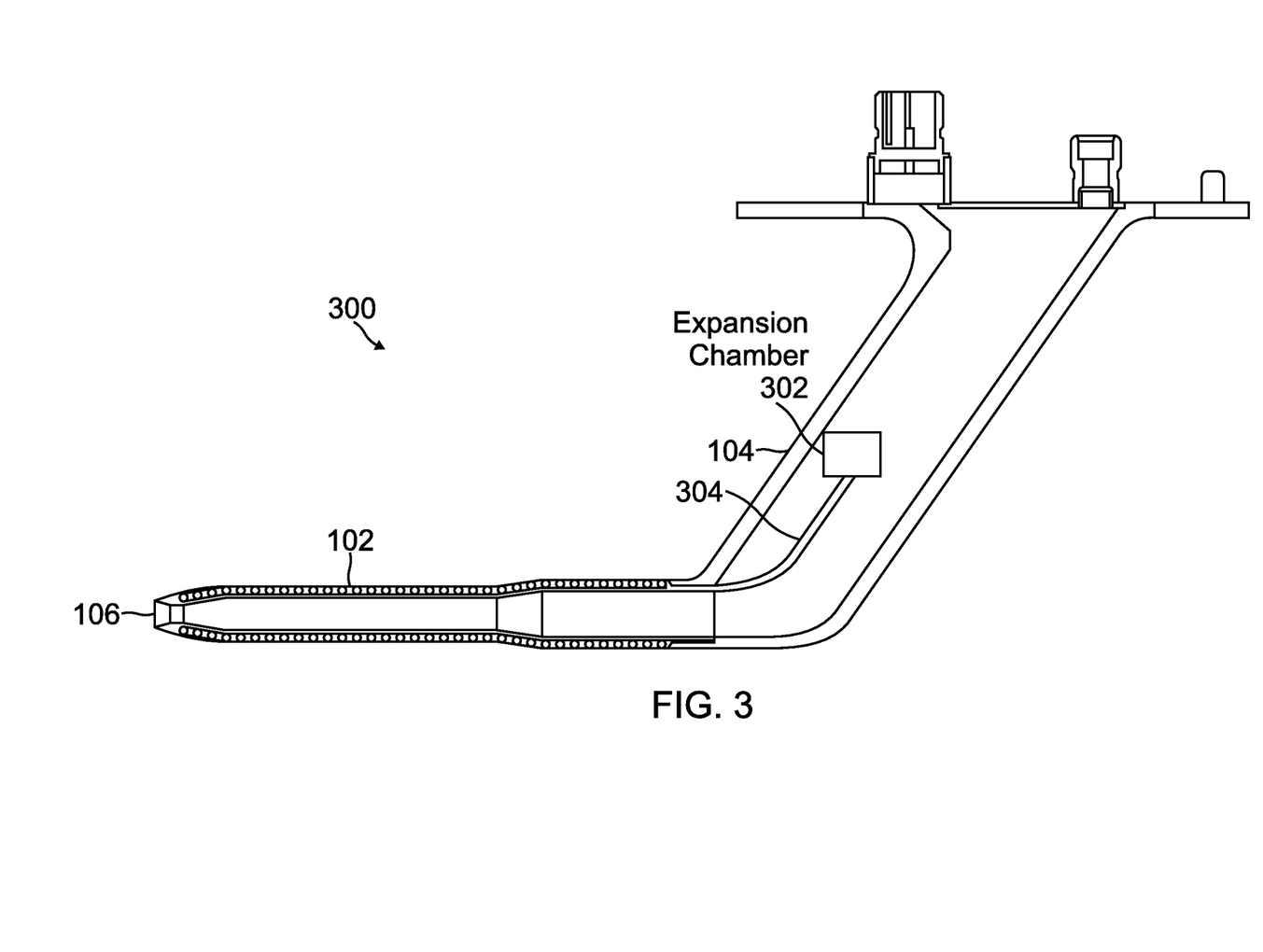
FIG. 3 is a cross-sectional view illustrating an example air data probe assembly according to one embodiment of the present disclosure.

FIG. 3 is a cross-sectional view of an example air data probe incorporating an expansion chamber. Air data probe 300 includes probe portion 102, strut portion 104, and an expansion chamber 302 connected to the cavity 210 through a connecting passage 304. The expansion chamber 302 is coupled to the cavity 210 of the probe portion 102 through the connecting passage 304. In exemplary embodiments, the expansion chamber 302 is positioned within the strut portion 104 such that it is always above the cavity 210 during operation so the low melting point metal 208 does not leak out of the cavity 210. If the low melting point metal 208 were to leak out of the cavity 210, then air gaps would be introduced into the cavity 210 and performance of the air data probe 300 would be reduced. In exemplary embodiments, the expansion chamber 302 could be a reservoir, an expandable bellows, or the like.

In exemplary embodiments, the connecting passage 304 has at least a first portion connected to a second portion. The first portion extends laterally from the cavity 210 into the strut and the second portion extends vertically through the strut portion 104. In exemplary embodiments, the connecting passage 304 is made of a similar material to the probe body 202 or another suitable material known to those having skill in the art.

Figure 4:
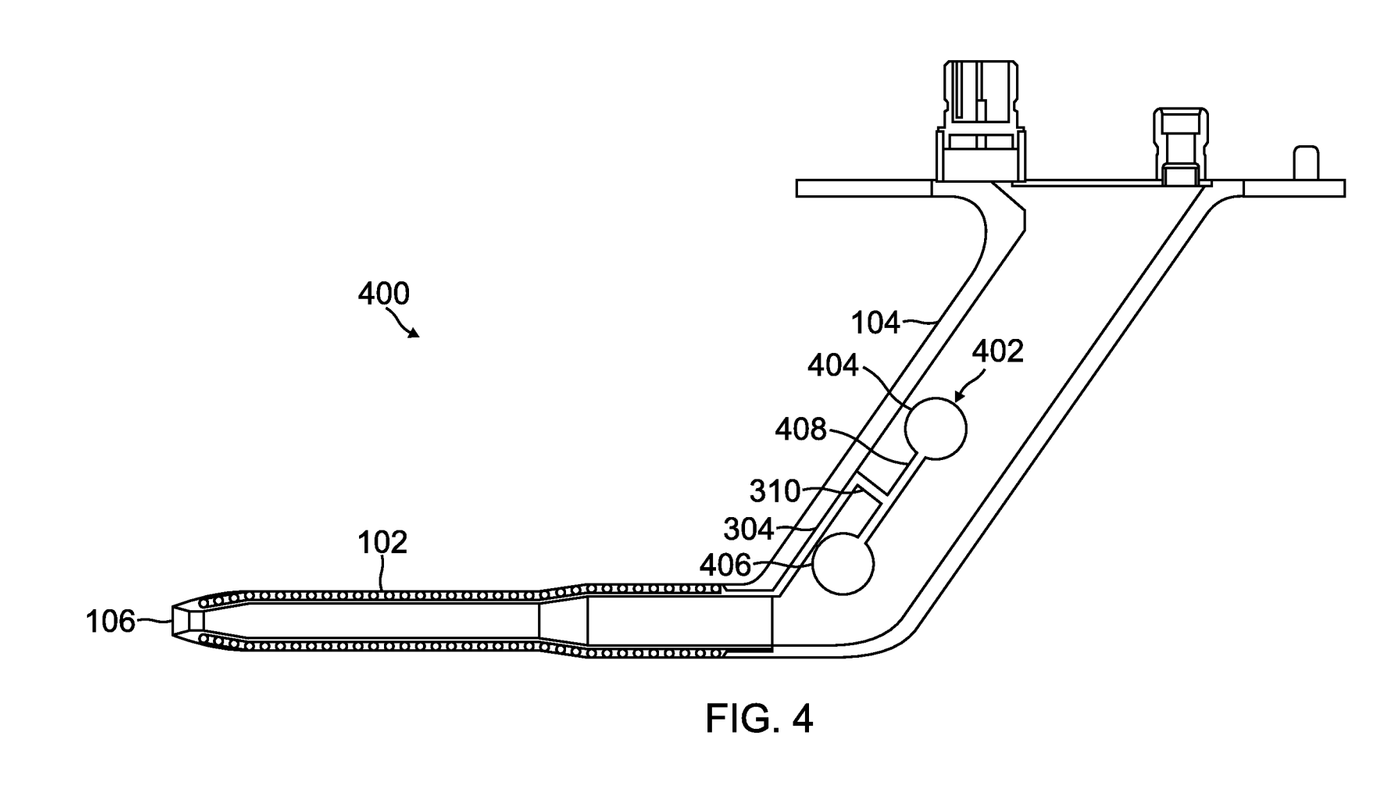
FIG. 4 is a cross-sectional view illustrating an example air data probe assembly according to one embodiment of the present disclosure.

FIG. 4 is a cross-sectional view of an example air data probe 400 incorporating a reservoir. The air data probe 400 includes probe portion 102, strut portion 104, and reservoir 402 connected to the cavity 210 through a connecting passage 304. In exemplary embodiments, the reservoir 402 is made of a similar material to the probe body 202 or another suitable material known to those having skill in the art. For similar reasons to those discussed above with respect to expansion chamber 302, the reservoir 402 is positioned within the strut portion 104 such that it always above the cavity 210 during operation.

The reservoir 402 can include one or more chambers and the chambers can have any suitable shape. For example, the chambers can be spherical. In embodiments utilizing one chamber, the single chamber is coupled directly to the second portion of the connecting passage 304. In embodiments utilizing two chambers, shown in FIG. 4, the first and second chambers 404, 406 are connected by a reservoir tube 408. The first chamber 404 is positioned above the second chamber 406 during operation. In such embodiments, the connecting passage 304 includes a third portion 310 that couples to the reservoir passage 408 such that the low melting point metal 208 can expand into the reservoir 402. In such embodiments, the entire connecting passage 304, the entire second chamber 406, and at least half of the reservoir passage 408 contain low melting point metal 208 to ensure that any transition of the low melting point metal 208 from a liquid state to a solid state does not result in a loss of low melting point metal 208 from the cavity 210. In particular, the expansion of the low melting point metal 208 will occur in the top half of the reservoir passage 408 and the first chamber 404.

Figure 5:
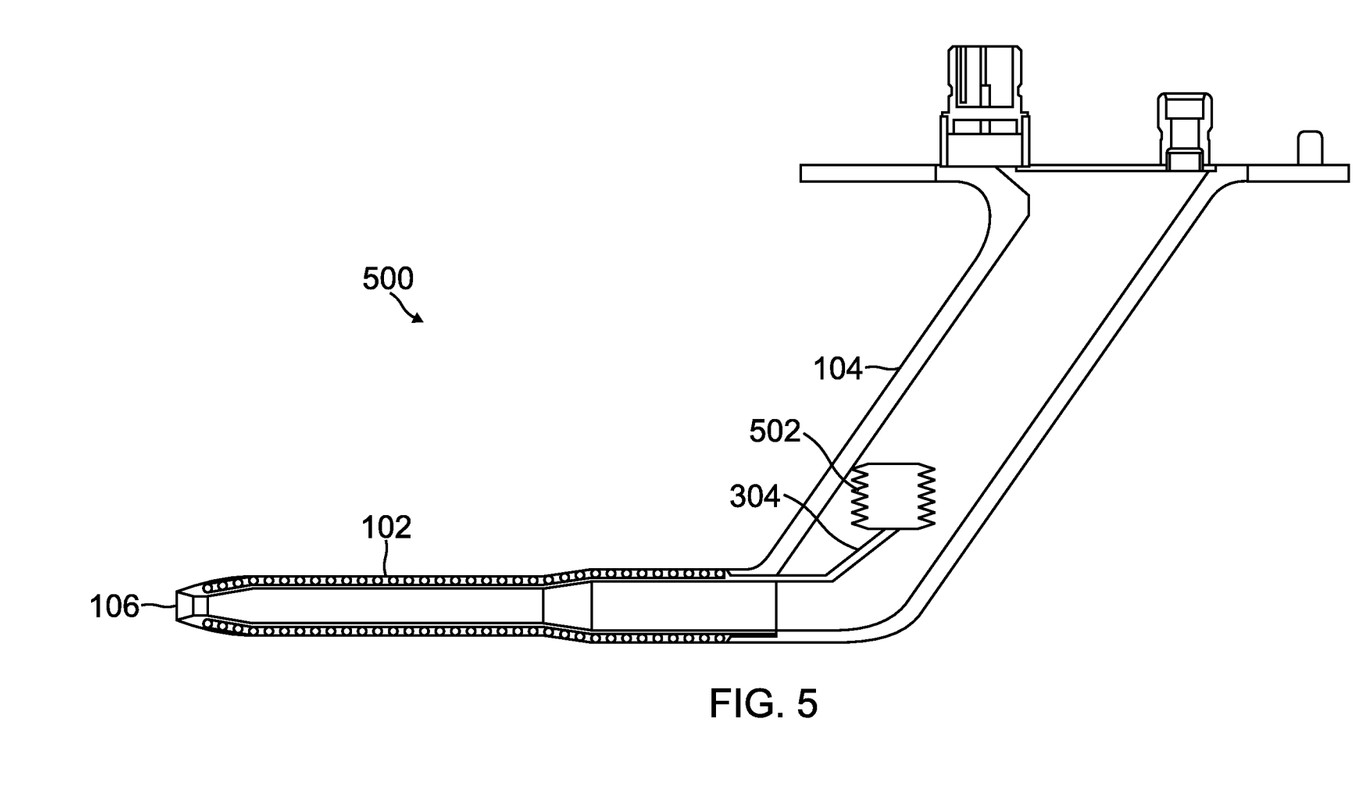
FIG. 5 is a cross-sectional view illustrating an example air data probe assembly according to one embodiment of the present disclosure.

FIG. 5 is a cross-sectional view of an example air data probe 500 incorporating an expandable bellows. The air data probe 500 includes probe portion 102, strut portion 104, and an expandable bellows 502 coupled to the cavity 210 through a connecting passage 304. The connecting passage 304 contains the same features as the connecting passage 304 discussed above with respect to FIG. 3. The expandable bellows 502 can include any suitable expandable bellows known in the art. For similar reasons to those discussed above with respect to expansion chamber 302, the expandable bellows 502 is positioned within the strut portion 104 such that it always above the cavity 210 during operation.

Figure 6:
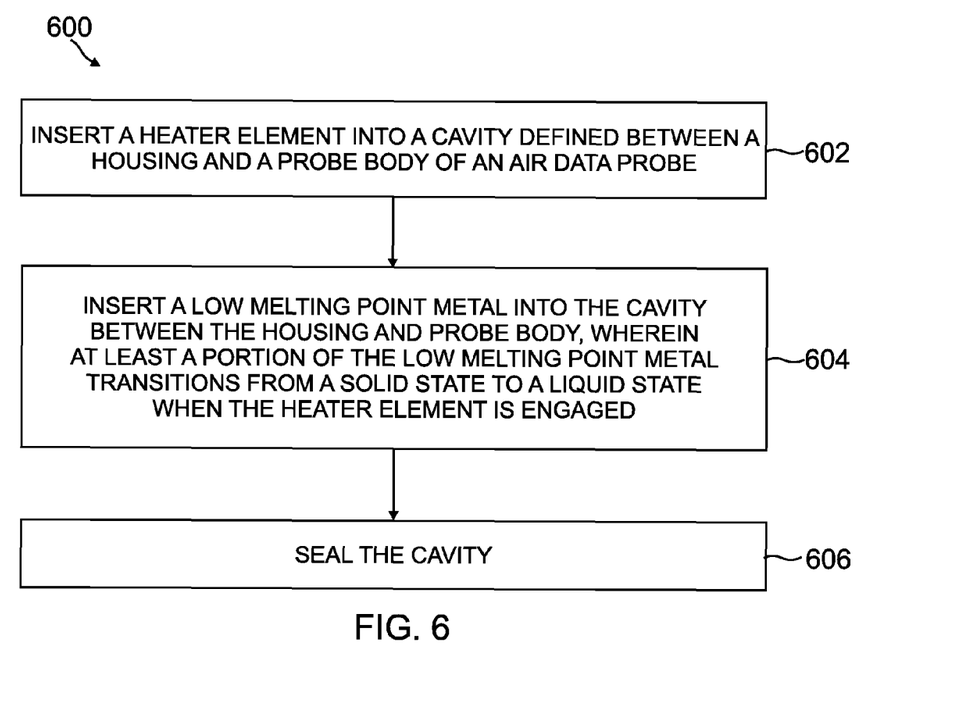
FIG. 6 is a flow chart illustrating a method of manufacturing an air data probe according to one embodiment of the present disclosure.

FIG. 6 is a flow chart illustrating a method 600 of manufacturing an air data probe according to one embodiment of the present disclosure. For example, method 600 could be used to manufacture air data probe 100 discussed above. Method 600 begins at 602 with inserting a heater cable into a cavity defined between a housing and a probe body of an air data probe.

The method 600 proceeds to 604 with inserting a low melting point metal into the cavity between the housing and the probe body, wherein at least a portion of the low melting point metal transitions from a solid state to a liquid state when the heater cable is engaged. In some embodiments, the low melting point metal is in a liquid state when inserted into the cavity. In other embodiments, the low melting point metal is in a solid state when inserted into the cavity.

The method 600 proceeds to sealing the cavity. In exemplary embodiments, sealing the cavity comprises attaching a first end of the housing to a first end of the probe body and attaching a second end of the housing to a second end of the probe body.

In some embodiments, the method further includes attaching a strut to the housing of the air data probe. Further, the method can also include attaching an expansion chamber (such as, for example, expansion chamber 302) to the cavity as discussed above with respect to FIGS. 1-4.

Figure 7:
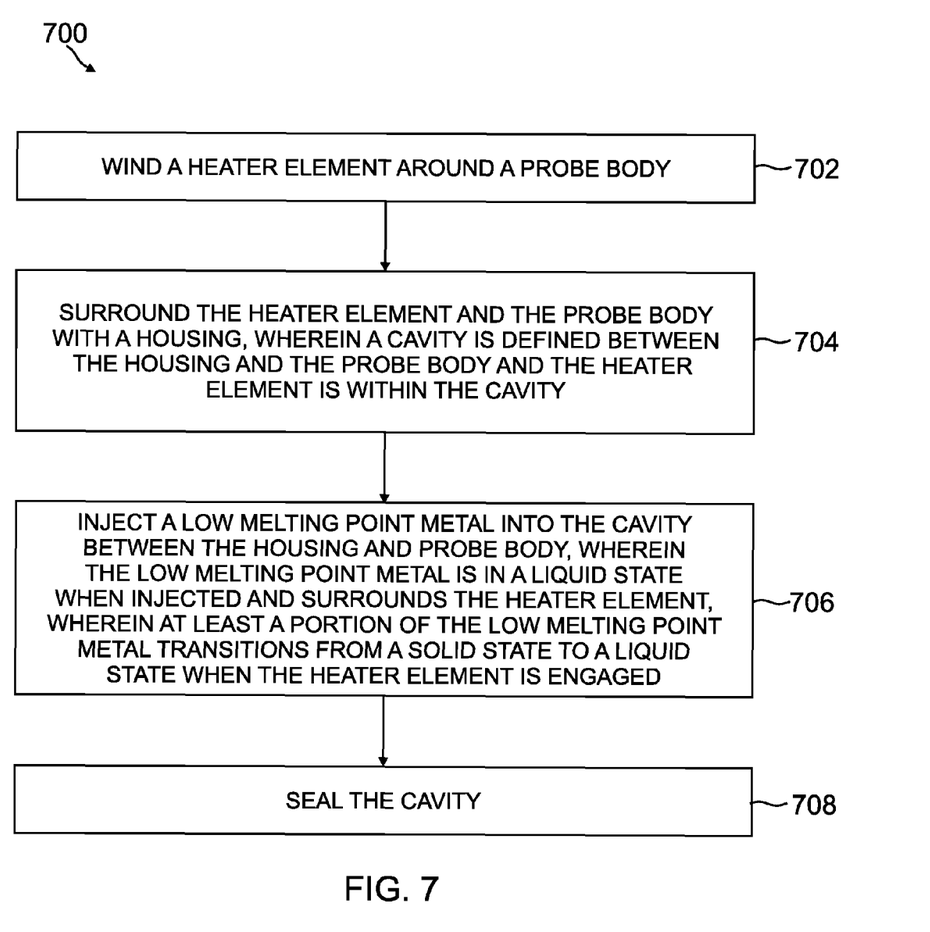
FIG. 7 is a flow chart illustrating a method of manufacturing an air data probe according to one embodiment of the present disclosure.

FIG. 7 is a flow chart illustrating a method 700 of manufacturing an air data probe according to one embodiment of the present disclosure. For example, method 700 could be used to manufacture air data probe 100 discussed above.

The method begins at 702 with winding a heater element around a probe body. In exemplary embodiments, the heater element is wound around the probe body in a substantially helical pattern. In exemplary embodiments, the probe body is a mandrel.

The method proceeds to 704 with surrounding the probe body with a housing such that a cavity is defined between the housing and the probe body and the heater element is within the cavity. In exemplary embodiments, surrounding the probe body with the housing includes attaching a first end of the housing to a first end of the probe body to seal one end of the cavity.

The method proceeds to 706 with injecting a low melting point metal into the cavity between the housing and the probe body. The low melting point metal is in a liquid state when injected into the cavity and surrounds the heater element. The low melting point metal has properties similar to low melting point metal discussed above with respect to FIGS. 1-4. For example, at least a portion of the low melting point metal transitions form a solid state to a liquid state when the heater element is engaged.

The method proceeds to 708 with sealing the cavity. In exemplary embodiments, sealing the cavity comprises attaching the second end of the housing to the probe body.

In some embodiments, the method further includes attaching a strut to the housing of the air data probe. Further, the method can also include attaching an expansion chamber (such as, for example, expansion chamber 302) to the cavity as discussed above with respect to FIGS. 1-4.

Figure 8:
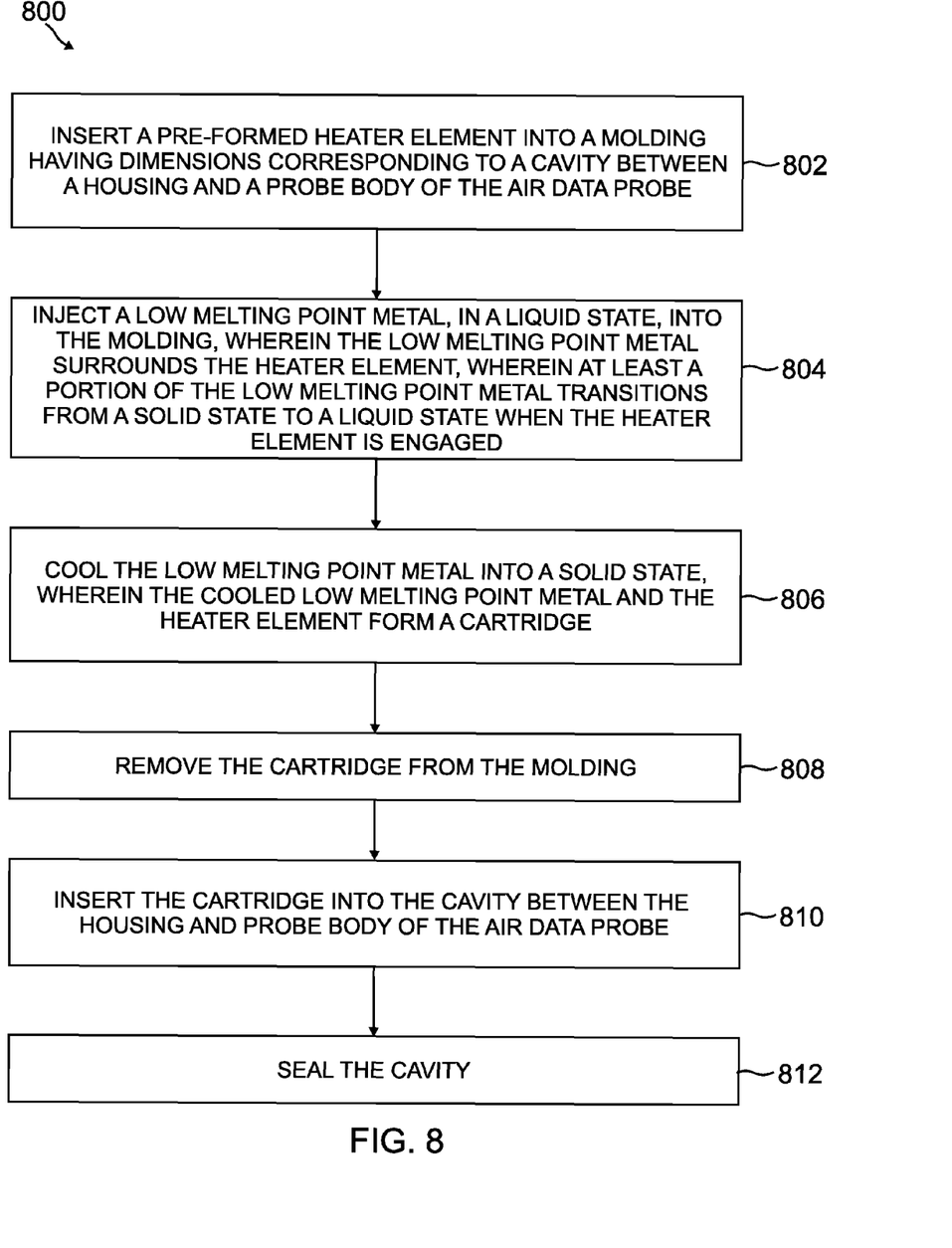
FIG. 8 is a flow chart illustrating a method of manufacturing an air data probe according to one embodiment of the present disclosure.

FIG. 8 is a flow chart illustrating a method 800 of manufacturing an air data probe according to one embodiment of the present disclosure. Method 800 utilizes a modular approach to manufacturing an air data probe.

The method begins at 802 with inserting a preformed heater element into a molding having dimensions corresponding to a cavity between a housing and a probe body of the air data probe. In exemplary embodiments, the molding can be a metallic molding that is used to form the low melting point metal into the shape of the cavity. In exemplary embodiments, the heater element is pre-formed by wrapping the heater element around a mandrel in a helical pattern.

The method proceeds to 804 with injecting a low melting point metal, in a liquid state, into the molding, wherein the low melting point metal surrounds the heater element in the molding. The low melting point metal has properties similar to low melting point metal discussed above with respect to FIGS. 1-4. At least a portion of the low melting point metal transitions form a solid state to a liquid state when the heater element is engaged.

The method proceeds to 806 with cooling the low melting point metal so the low melting point metal transitions to a solid state. The heater element is within the low melting point metal. The cooled low melting point metal and the heater element form a cartridge or module. After the low melting point metal has cooled, the method proceeds to 808 with removing the cartridge from the molding. The method proceeds to 810 with inserting the cartridge into the cavity between the housing and the probe body of the air data probe. The method proceeds to 812 with sealing the cavity.

In some embodiments, the method further includes attaching a strut to the housing of the air data probe. Further, the method can also include attaching an expansion chamber 302 to the cavity as discussed above with respect to FIGS. 1-4.

The systems and methods for heating an air data probe discussed above in the present application provide several benefits over traditional air data probes. By using a low melting point metal between the probe body and the housing, thermal stress on the heater element is reduced because the heater element is floating inside the cavity in the low melting point metal.

The heater element no longer needs to be precisely shaped, precisely placed within the housing of the air data probe, or brazed to the housing of the air data probe, which significantly reduces the cost and complexity of the manufacturing process. This also reduces wear on the heater element caused by over-forming during traditional methods.

The low melting point metal, when in a liquid state, more evenly distributes the heat from the heater element throughout the housing than traditional methods that involve brazing the heater element onto the inner surface of the housing. In particular, the low melting point metal contacts a greater amount of the surface of the housing than is possible using traditional methods. The embodiments of the present disclosure achieve better fewer undesired cold spots on the housing and better de-icing and icing prevention.

Example Embodiments

Example 1 includes an air data probe comprising: a probe body; a housing surrounding the probe body, wherein a cavity is defined between the probe body and the housing; a heater element disposed within the cavity between the probe body and the housing; and a low melting point metal disposed within the cavity between the probe body and the housing, wherein engaging the heater element causes at least a portion of the low melting point metal to transition from a solid state to a liquid state.

Example 2 includes the air data probe of Example 1, wherein the low melting point metal includes at least one of: sodium, a silver solder; a lead-tin solder; an antimony-tin solder; an indium-silver solder.

Example 3 includes the air data probe of any of Examples 1-2, wherein the heater element is a heater cable comprising a resistive wire surrounded by a mineral insulate and covered by a metallic sheath.

Example 4 includes the air data probe of Example 3, wherein the heater element is helical-shaped and surrounds the probe body.

Example 5 includes the air data probe of any of Examples 1-4, further comprising a strut attached to the housing.

Example 6 includes the air data probe of Example 5, further comprising an expansion chamber within the strut, wherein the expansion chamber is coupled to the cavity through a passage.

Example 7 includes the air data probe of Example 6, wherein the expansion chamber is a reservoir comprising one or more chambers.

Example 8 includes the air data probe of Example 7, wherein the passage and one or more chambers include excess low melting point metal.

Example 9 includes the air data probe of any of Examples 6-8, wherein the expansion chamber is an expandable bellows.

Example 10 includes the air data probe of any of Examples 5-9, wherein the expansion chamber is positioned within the strut to be above the cavity when the air data probe is in motion.

Example 11 includes the air data probe of any of Examples 1-10, wherein the low melting point metal has a higher thermal conductivity in the liquid state than in the solid state.

Example 12 includes the air data probe of any of Examples 1-11, wherein the low melting point metal surrounds the heater element.

Example 13 includes a method of manufacturing an air data probe comprising: inserting a heater element into a cavity defined between a housing and a probe body of the air data probe; inserting a low melting point metal into the cavity between the housing and the probe body, wherein at least a portion of the low melting point metal transitions from a solid state to a liquid state when the heater element is engaged; and sealing the cavity.

Example 14 includes the method of Example 13, wherein inserting a low melting point metal into the cavity between the housing and the probe body comprises injecting the low melting point metal into the cavity, wherein the low melting point metal is in a liquid state when injected into the cavity, wherein the low melting point metal surrounds the heater element.

Example 15 includes the method of any of Examples 13-14, wherein the low melting point metal is pre-formed in a molding having the dimensions of the cavity, wherein the low melting point metal is injected into the molding in a liquid state and cooled to a solid state, wherein the low melting point metal is in a solid state when inserted into the cavity.

Example 16 includes the method of Example 15, wherein the heater element is pre-formed on a mandrel, wherein the pre-formed heater element is inserted into the molding having the dimensions of the cavity, wherein the low melting point metal surrounds the heater element when it is injected into the molding in a liquid state, wherein the heater element is within the low melting point metal when it is cooled to a solid state.

Example 17 includes the method of any of Examples 13-16, further comprising attaching a strut to the housing of the air data probe.

Example 18 includes the method of Example 17, further comprising attaching a passage and a reservoir to the cavity, wherein the passage and the reservoir are positioned within the strut.

Example 19 includes the method of any of Examples 17-18, further comprising attaching a passage and a bellows to the cavity, wherein the passage and the bellows are positioned within the strut.

Example 20 includes an air data probe comprising: a mandrel; a housing surrounding the mandrel, wherein a cavity is defined between the housing and the mandrel; a heater element disposed within the cavity; and a low melting point metal disposed within the cavity defined between the housing and the mandrel, wherein at least a portion of the low melting point metal transitions from a solid state to a liquid state when the heater element is engaged.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:
1. An air data probe comprising:
a probe body;
a housing surrounding the probe body, wherein a cavity is defined between the probe body and the housing;
a heater element disposed within the cavity between the probe body and the housing; and
a low melting point metal disposed within the cavity between the probe body and the housing, wherein engaging the heater element causes at least a portion of the low melting point metal to transition from a solid state to a liquid state.
2. The air data probe of claim 1, wherein the low melting point metal includes at least one of: sodium, a silver solder; a lead-tin solder; an antimony-tin solder; an indium-silver solder.

3. The air data probe of claim 1, wherein the heater element is a heater cable comprising a resistive wire surrounded by a mineral insulate and covered by a metallic sheath.

4. The air data probe of claim 3, wherein the heater element is helical-shaped and surrounds the probe body.

5. The air data probe of claim 1, further comprising a strut attached to the housing.

6. The air data probe of claim 5, further comprising an expansion chamber within the strut, wherein the expansion chamber is coupled to the cavity through a passage.

7. The air data probe of claim 6, wherein the expansion chamber is a reservoir comprising one or more chambers.

8. The air data probe of claim 7, wherein the passage and one or more chambers include excess low melting point metal.

9. The air data probe of claim 6, wherein the expansion chamber is an expandable bellows.

10. The air data probe of claim 5, wherein the expansion chamber is positioned within the strut to be above the cavity when the air data probe is in motion.

11. The air data probe of claim 1, wherein the low melting point metal has a higher thermal conductivity in the liquid state than in the solid state.

12. The air data probe of claim 1, wherein the low melting point metal surrounds the heater element.

13. A method of manufacturing an air data probe comprising:
   inserting a heater element into a cavity defined between a housing and a probe body of the air data probe;
   inserting a low melting point metal into the cavity between the housing and the probe body, wherein at least a portion of the low melting point metal transitions from a solid state to a liquid state when the heater element is engaged; and
   sealing the cavity.

14. The method of claim 13, wherein inserting a low melting point metal into the cavity between the housing and the probe body comprises injecting the low melting point metal into the cavity, wherein the low melting point metal is in a liquid state when injected into the cavity, wherein the low melting point metal surrounds the heater element.

15. The method of claim 13, wherein the low melting point metal is pre-formed in a molding having the dimensions of the cavity, wherein the low melting point metal is injected into the molding in a liquid state and cooled to a solid state, wherein the low melting point metal is in a solid state when inserted into the cavity.

16. The method of claim 15, wherein the heater element is pre-formed on a mandrel, wherein the pre-formed heater element is inserted into the molding having the dimensions of the cavity, wherein the low melting point metal surrounds the heater element when it is injected into the molding in a liquid state, wherein the heater element is within the low melting point metal when it is cooled to a solid state.

17. The method of claim 13, further comprising attaching a strut to the housing of the air data probe.

18. The method of claim 17, further comprising attaching a passage and a reservoir to the cavity, wherein the passage and the reservoir are positioned within the strut.

19. The method of claim 17, further comprising attaching a passage and a bellows to the cavity, wherein the passage and the bellows are positioned within the strut.

20. An air data probe comprising:
   a mandrel;
   a housing surrounding the mandrel, wherein a cavity is defined between the housing and the mandrel;
   a heater element disposed within the cavity; and
   a low melting point metal disposed within the cavity defined between the housing and the mandrel, wherein at least a portion of the low melting point metal transitions from a solid state to a liquid state when the heater element is engaged.

* * * * *